C. A. BISBEE.
CAR FENDER.
APPLICATION FILED NOV. 18, 1907. RENEWED JAN. 13, 1909.

918,268.

Patented Apr. 13, 1909.
2 SHEETS—SHEET 1.

WITNESSES:

INVENTOR:
CHAUNCEY A. BISBEE.
BY
Pierre Barnes
ATTORNEY

C. A. BISBEE.
CAR FENDER.
APPLICATION FILED NOV. 18, 1907. RENEWED JAN. 13, 1909.

918,268.

Patented Apr. 13, 1909.
2 SHEETS—SHEET 2.

WITNESSES:
H. W. Hubbard
Horace Barnes

INVENTOR
CHAUNCEY A. BISBEE.
BY
Pierre Barnes
ATTORNEY

UNITED STATES PATENT OFFICE.

CHAUNCEY A. BISBEE, OF SEATTLE, WASHINGTON.

CAR-FENDER.

No. 918,268.      Specification of Letters Patent.      Patented April 13, 1909.

Application filed November 13, 1907, Serial No. 402,705.    Renewed January 13, 1909.    Serial No. 472,130.

*To all whom it may concern:*

Be it known that I, CHAUNCEY A. BISBEE, a citizen of the United States, and resident of Seattle, in the county of King and State of Washington, have invented certain new and useful Improvements in Car-Fenders, of which the following is a specification.

The object of this invention is the provision of a car-fender which will be yieldingly held at a short distance above the track and which in an emergency can be readily lowered into juxtaposition therewith by devices under the control of and conveniently actuated by an operator. The advantages accruing from such functions are especially valuable in railway systems at places where the grades are uneven and where it is impracticable to ordinarily carry a fender at its most effective position for effecting the saving of human life.

The invention consists in the novel construction, adaptation and combination of parts, as will be hereinafter described and claimed.

Figure 1:
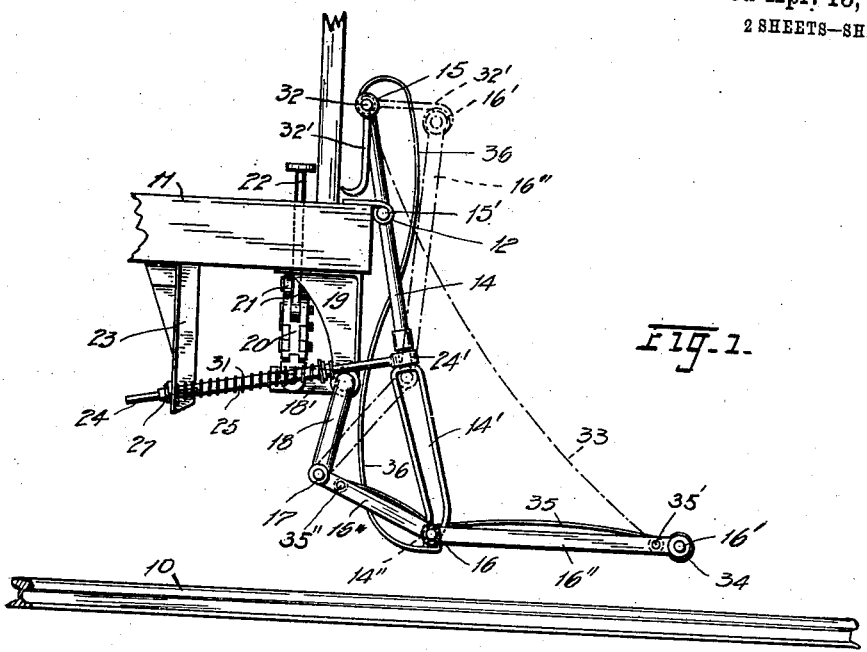
Figure 2:
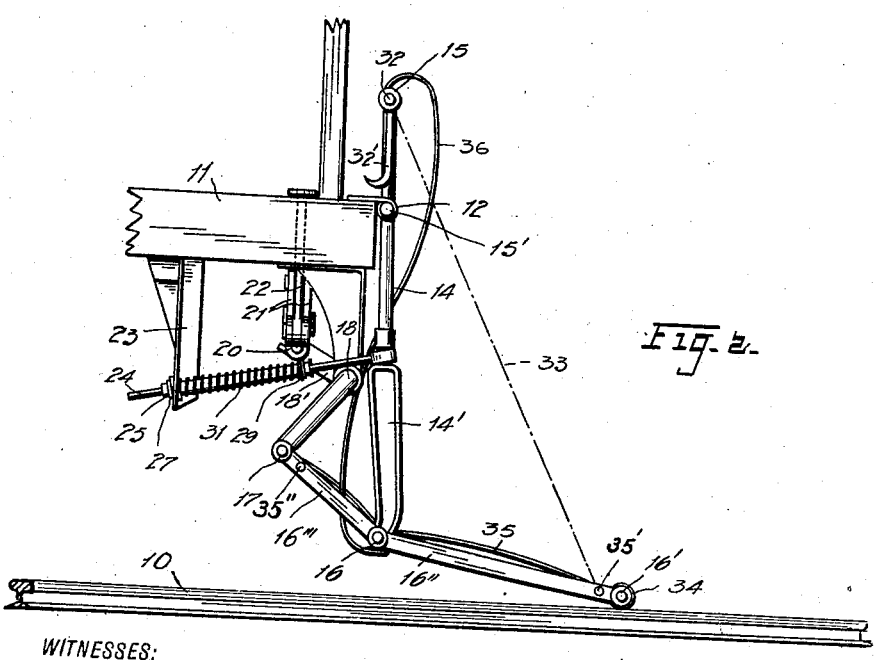
Figure 3:
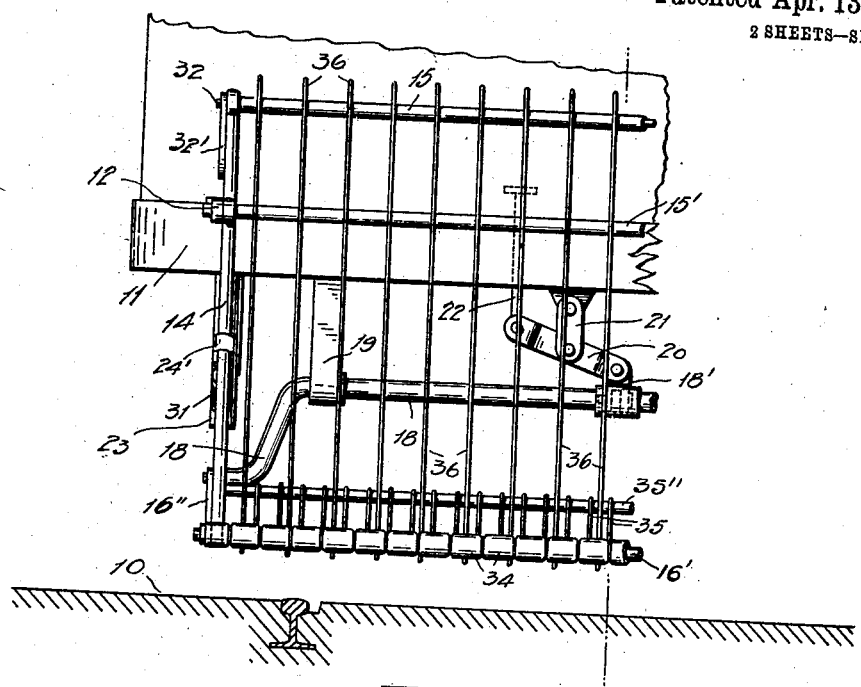
Figure 4:
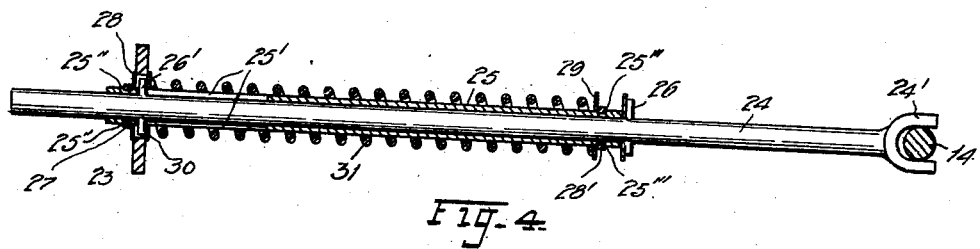
Figures 5, 6:
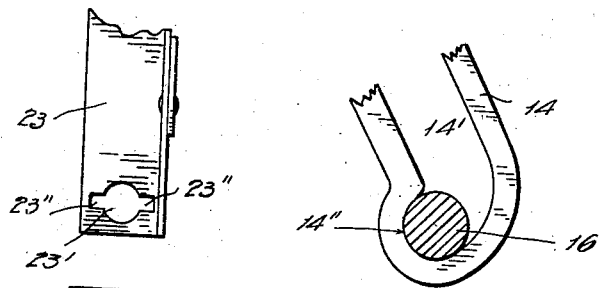

Figure 1 is a side elevation of an embodiment of my invention shown attached to the front of a car and illustrating the fender in its normal position; Fig. 2 is a similar view with the fender in its inoperative position; Fig. 3 is a fragmentary front elevation with the parts in the condition in which they are represented in Fig. 1. Fig. 4 is a plan view, partly in section, of the yielding rear support for the fender. Figs. 5 and 6 are detail views.

In these drawings, the reference numeral 10 indicates the track-surface of a railway line and 11 the front platform of a car. Rigidly secured to the forward end of said platform and in proximity to each of its sides is a hinge element 12 for a rectangular-shaped frame of the upper fender part which is comprised of side members 14 and transverse members 15 and 15′ of which the latter, 15′, protrudes outside of the members 14 and affords pivots whereby the frame is fulcrumed to said hinge elements. The lower portions of the members 14 are each formed with a longitudinal slot 14′ which is provided at its lower extremity with an angular bend, to provide a recess or seat 14″, as best shown in Fig. 5. Seated within said slots is a transversely arranged bar 16 at the rear of the frame of the lower fender part, or fender, as it will be denominated in the following description. This fender is formed, in addition to the bar 16, of a front transverse bar-member 16′ and side members 16″ which extend rearwardly of the bar 16 to furnish arms 16‴. Such arms are pivotally connected at 17 with the offset extremities of a rock-shaft 18 which is journaled in hangers 19 depending from the car-platform. Centrally of its length shaft 18 is provided with a rearwardly extending arm 18′. A lever 20 fulcrumed to links 21 operatively connects the shaft arm 18′ with the bottom of a tread rod 22 which extends through the car platform to be within convenient reach of the motorman's foot.

23 represents one of a pair of brackets depending from the car and in the longitudinal planes with the respective members 14. A rod extends through an aperture 23′ of each such bracket and is provided with a forked end 24′, or an eye, inclosing the respective member 14. Referring particularly to Fig. 4, a tube 25 incloses the rod 24 from a pin 26 extending through the rod to some distance beyond the bracket, and to permit a longitudinal play of another pin 26′ which is also fixed to the rod, are provided slots 25′ in the tube and notches 23″ extending from the aperture in the bracket. The tube is notched, as at 25″, to accommodate a split-ring 27 serving to restrain a washer 28 whose office is through interference to prevent the withdrawal of the tube from the bracket. Notches 25‴ are provided adjacent of the other end of the tube for a split-ring 28′ to make a stop for another washer 29 carried by the tube. Between the last named washer and a washer 30, which intermittently bears against the bracket and the pin 26′, is a coil-spring 31.

The frame-member 15 is desirably made tubular and through it extends a rod 32 carrying upon its ends hooks, such as 32′, which serve to engage over the bar-member 16′ when the fender is tilted up into the position in which it is represented by broken lines in Fig. 1, as would be done with the fender at the rear end of a car and also with the one at the front end when housed in the car-barn.

A chain 33, indicated diagrammatically in Figs. 1 and 2, would be employed to limit the amount of depression which may be given to the forward end of the fender.

34 represents rollers carried by the bar-member 16' to make engagement with the track surface.

35 represents flexible rods employed upon the fender and extend from a transverse rod 35' near the front thereof to a rod 35'' extending between the arms 16'''. 36 are similar rods connected with the member 15 of one frame and the member 16 of the other.

The operation of the invention is as follows: The upper of the two frames being supported by its member 15' from hinge elements 12 is tiltably maintained in the position in which it is represented in Fig. 1 by the action of the coiled springs 31. The lower frame, or fender proper, being supported by the side members 14 of the other frame, will accordingly be held in its normal position, shown by full lines in this view, by reason of the fender arms 16''' being connected with the arms 18' of the shaft 18 which is journaled in stationary hangers 19. When, however, sufficient pressure is exerted by the motorman upon the tread rod 22 to overcome the force of the springs and impart a rearward swing to the shaft arms 18', the latter drags the fender therewith and coincidently, by reason of the arc taken by their connection 17, tilts such arms upwardly and the forward end of the fender downwardly about the bar 16 by which it is supported from the upper frame members 14 and which is supplemented by the rearward swing of these members, and thus bring the fender and the actuating parts in the relation in which they are illustrated in Fig. 2. When the foot tread is released the springs reassert their power and return the apparatus to appear as in Fig. 1, that is to normal. When the fender is in either of the positions represented, or intermediately of the same, the cross bar 16 of the fender frame is seated in the offset portions 14'' of the slots 14' whereby it is maintained against accidental displacement and is retracted only by a forward pull upon the fender by an attendant when the fender is to be swung up to be as shown by broken lines in Fig. 1.

The springs 31 in addition to serving in the capacity above referred to, namely, returning the fender to normal position, likewise act to yieldingly allow the fender being tilted downwardly irrespective of the volition of the motorman, as for example, when the fender encounters an obstacle in its path. Such double action of the springs is accomplished by the employment of the various devices illustrated in Fig. 4 and which operates thus: When the rod 24 is pushed rearwardly, in manipulating the fender to lower the same upon the track, the spring is compressed between the washer 26' and the washer 29 upon the tube 25 which, because of the pin 26, accompanies the rod and slides some distance through the bracket. The reverse action, namely, the capacity to resist an opposite force, is attained through the pin 26' of the rod 24 being free to slide in the tube slots 25 admitting movement in a reverse direction of the rod independently of the tube while the spring yields to the advance of the washer 30.

What I claim as my invention, is—

1. In apparatus of the class described, the combination of an upper fender part tiltably connected with a car, a lower fender part fulcrumed to the other part and extending forwardly therefrom, a transversely disposed shaft having crank arms which engage with arms protruding rearwardly from the lower fender part, an arm intermediate the length of said shaft, a tread-bar, hangers to afford stationary bearing for said shaft, a fixed bracket, a rod connected with said lower fender part, and a spring upon said rod tending to maintain the lower fender part in inoperative condition.

2. In apparatus of the class described, the combination with a fender arranged for movement, and a fixed bracket, of a slotted tube passing through an aperture in the bracket, a rod extending through the tube and having one of its ends connected to the fender, means upon the rod for limiting the movement of the tube in one direction with respect to the rod, a washer carried by the tube in proximity of its forward end, a washer loosely fitted upon the tube, a spring interposed between the two aforesaid washers, a third washer upon the tube, means for limiting the movement of the first and third named washers, and a pin extending through the rod and the slots of the tube and disposed intermediate the second and third named washers.

3. A car fender comprising an upper fender part tiltably connected with a car and a lower fender part fulcrumed to the upper fender part and extending forwardly therefrom, rearwardly extending arms carried by the lower fender part, hangers carried by said car, a rock shaft journaled in said hangers having crank arms on its ends engaging with the rearwardly extending arms of said lower fender part, a rod connected at its forward end with said lower fender part, a bracket carried by the car through which the rear end of said rod extends, and a spring on said rod between the bracket and a collar located on said rod adjacent the forward end thereof.

4. In a car fender the combination with a car, of a fender tiltably connected therewith, a fixed bracket carried by the car, a slotted tube passed through an aperture in the bracket, a rod extending through an aperture in the bracket, a rod extending through said tube and having its forward end connected with the fender, and means on said rod for limiting the movement of the tube in one direction with respect to the rod.

Signed at Seattle, Washington, in the presence of two witnesses.

CHAUNCEY A. BISBEE.

Witnesses:
 HORACE BARNES,
 PIERRE BARNES.